July 7, 1936.   H. R. TEAR   2,046,418
LUBRICATING DEVICE
Filed Nov. 21, 1932

INVENTOR
HARRY R. TEAR.
BY
ATTORNEY

Patented July 7, 1936

2,046,418

UNITED STATES PATENT OFFICE 2,046,418

LUBRICATING DEVICE

Harry E. Tear, South Bend, Ind., assignor to The Lubrication Corporation, South Bend, Ind., a corporation of Delaware Application November 21, 1932, Serial No. 643,688

5 Claims. (Cl. 184—105)

This invention relates to improvements in lubricating devices and more particularly to lubricant receiving fittings.

Heretofore lubricant receiving nipples or fittings have been provided having a valve incorporated therein normally held against its seat by a compression spring, which, because of the relatively small space within which it is confined must necessarily be constructed of comparatively light spring stock and therefore subject to slight unintentional distortion in use. This distortion of the spring has often resulted in the spring slipping off from its retaining member or pin during valve operation thus rendering the valve inoperative.

An object of the invention is to provide a lubricant receiving fitting incorporating a valve spring retaining element adapted to partially enter the core of the spring so as to prevent the spring from slipping laterally from the retainer.

Another object is to provide a lubricant receiving fitting having a valve spring retainer member which functions to automatically center the valve spring within the space provided therefor.

Figure 1:
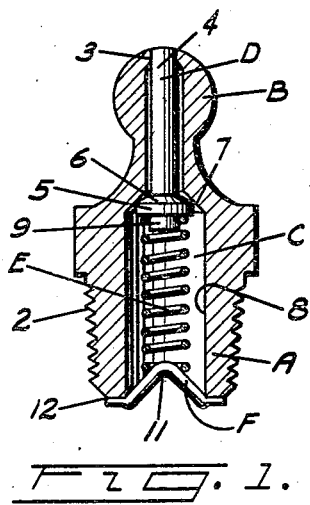
Figure 2:
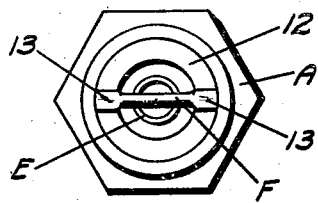

Other objects, the advantages, and uses of the invention, will be, or should become apparent after reading the following description and claims and after consideration of the accompanying drawing forming a part of this specification, in which:

Fig. 1 is a sectional view of a lubricant receiving fitting embodying a valve spring retainer constructed in accordance with the invention; and Fig. 2 is a bottom plan view of the lubricant fitting of Fig. 1.

In general, the embodiment of the invention selected for illustration herein comprises a lubricant receiving fitting having a shank A and a head B, a passageway C extending through the head and shank, a valve D for closing the passageway C, a spring E located within an enlarged portion of the passageway C, and a spring retainer F bridging the outer end of the shank and welded at its opposite ends thereto.

With particular reference to Figs. 1 and 2, the shank A and head B of the fitting may be constructed of a single screw machined part provided with screw threads 2 upon the external walls of the shank for securing the fitting within the lubricant bore or duct of a bearing or other part with which the fitting is to be associated. The passageway C may have a constricted portion 3 at its inlet end of substantially the diameter of the outer portion 4 of the valve D so that the accidental admission of extraneous matter into the fitting may be avoided. The inner end of the valve member B may be provided with a diametrically enlarged portion 5 formed with a substantially conical valve seat engaging surface 6 arranged to bear upon a similarly formed surface 7 formed at the juncture of the major portion of the passageway C and the diametrically enlarged portion 8 thereof. The rearward end of the valve member D has a short cylindrical stud 9 formed thereon about which the outer end of the spring E may be located so as to prevent lateral shifting of the spring relative to the valve member and to the portion 8 of the passageway C.

The fitting thus far described comprises that type of fitting commonly employed for automotive and machine lubricating purposes. The present invention relates to the formation and affixing of the spring retainer F to the fitting shank A and in its combination with the fitting valve spring E the spring retainer may be formed of steel wire stock bent at substantially 90° at its mid-point as shown at 11 and located diametrically across the outer end 12 of the fitting shank and affixed thereto at its opposite ends by electric welding, as indicated at 13. The position of the retainer F when so affixed to the shank A is such as to cause the bent mid-portion 11 to extend toward the valve D so that the lower end of the spring E may rest thereupon thus prohibiting the lateral shifting of that end of the spring, particularly when compressed as when the valve is opened, thereby eliminating the possibility of dislodgment of the spring from the retainer and consequent inoperativeness of the valve D. A further function of the bent portion 11 of the retainer F is to centrally locate the rearward end of the spring with respect to the enlarged portion 8 of the passageway C so as to apply a direct axial thrust to the valve member D to encourage uniform seating of the valve upon the valve seat 7.

A lubricant receiving fitting constructed as described permits the use of a valve spring E of relatively small diameter with respect to the diameter of the portion 8 of the passageway C so as to assure a free flow of lubricant through the passageway as when the valve D is open and the coils of the spring compressed against one another. This feature is attained, as set forth, by the bent formation of the spring retainer F which serves to hold the spring against lateral shifting and hence dislodgment from the retainer. Further the valve D is caused to uniformly bear upon its seat to provide an efficient seal for the passageway as a result of the central positioning of the spring.

The method of securing the retainers to the fitting shanks and novel preformed retainers are fully described and claimed in my copending application Serial No. 20,447, filed May 8, 1935.

It is to be understood that the described embodiments of the invention herein set forth are presented for the purpose of illustration only, and various changes may be made therein without departing from the spirit and scope of the invention.

I claim:

1. In a lubricant receiving fitting having a passageway therethrough, a valve in said passageway, a coiled compression spring arranged to bear, at one end, upon said valve, and an elongated wirelike retainer member, providing a support for the other end of said spring, extending diametrically across said passageway and secured at its ends to said fitting and having its mid-portion formed to enter within the adjacent end of said spring.

2. In a lubricant receiving fitting having a passageway therethrough, a valve in said passageway, a coiled compression spring arranged to bear, at one end, upon said valve member, and an elongated retainer member, providing a support for the other end of said spring, extending diametrically across said passageway and having its mid-portion formed with a V-shaped bend adapted to enter within the adjacent end of said spring.

3. A lubricant receiving fitting comprising a body having a shank for securing the fitting upon a bearing or other part to be lubricated, said body and shank having a passageway extending longitudinally therethrough, a valve located in said passageway, a compression spring, in axial alignment with said valve, in said passageway, the diameter of said spring being appreciably less than the diameter of said passageway, and a wirelike retainer member for supporting said spring secured at opposite ends to said shank and extending diametrically across the mouth of said passageway, said retainer having a portion thereof formed to engage with, and locate said spring centrally within said passageway.

4. In a lubricant receiving fitting having a passageway therethrough, a valve in said passageway, a compression spring in said passageway for operating said valve, and a short length of steel wire fixed across the end of said fitting and having its mid-portion extending centrally within said passageway for supporting and locating one end of said spring.

5. In a lubricant receiving fitting having a passageway therethrough, a valve in said passageway, a compression spring in said passageway for operating said valve, and a short length of steel wire disposed across the end of said fitting and having its mid-portion formed with a V-shaped bend extending centrally within said passageway for supporting and locating one end of said spring, said wire being secured at its outer ends to said end of said fitting.

HARRY R. TEAR.